United States Patent
Kuroki

(10) Patent No.: US 9,289,957 B2
(45) Date of Patent: Mar. 22, 2016

(54) PNEUMATIC TIRE

(75) Inventor: Takeshi Kuroki, Hyogo (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 1181 days.

(21) Appl. No.: 13/266,879

(22) PCT Filed: Mar. 17, 2010

(86) PCT No.: PCT/JP2010/054517
§ 371 (c)(1),
(2), (4) Date: Oct. 28, 2011

(87) PCT Pub. No.: WO2010/131517
PCT Pub. Date: Nov. 18, 2010

(65) Prior Publication Data
US 2012/0048435 A1 Mar. 1, 2012

(30) Foreign Application Priority Data
May 15, 2009 (JP) ................. 2009-119160

(51) Int. Cl.
B60C 19/08 (2006.01)
B60C 1/00 (2006.01)
B61C 11/00 (2006.01)
B29D 30/60 (2006.01)
B29D 30/30 (2006.01)
B60C 11/00 (2006.01)
B29D 30/52 (2006.01)

(52) U.S. Cl.
CPC ............ B29D 30/3028 (2013.01); B29D 30/60 (2013.01); B60C 11/0058 (2013.04); B60C 19/082 (2013.04); B29D 2030/526 (2013.01); B60C 2011/0091 (2013.04)

(58) Field of Classification Search
CPC .... B60C 19/08; B60C 1/082; B60C 11/0008; B60C 2011/0016; B60C 11/0041; B60C 11/005; B60C 2011/0091; B60C 1/00; B60C 11/0058; B60C 11/0075; B29D 2030/526; B29D 30/3028; B29D 30/3021; B29D 30/1621; B29D 30/1628; B29D 30/60
USPC ................ 152/152.1, 209.5, DIG. 2; 156/117
See application file for complete search history.

(56) References Cited

U.S. PATENT DOCUMENTS

2002/0185210 A1   12/2002   Poulbot
2006/0174986 A1*  8/2006    Ogawa .................. 152/152.1
(Continued)

FOREIGN PATENT DOCUMENTS

DE   10 2006 050 840 A1   4/2008
JP        9-071112 A       3/1997
(Continued)

OTHER PUBLICATIONS

JP 2007-290485, Nov. 2007, English language machine translation [www.epo.org].*

(Continued)

*Primary Examiner* — Eric Hug
(74) *Attorney, Agent, or Firm* — Birch, Stewart, Kolasch & Birch, LLP

(57) ABSTRACT

A tread rubber 2G comprises a base portion 9 made of electrically non-conductive rubber compounding silica and having a width substantially equal to a width of the tread reinforcing-cord layer 7; a conducting portion 11 made of the electrically conductive rubber, covering a radially outer surface of the base portion 9 and extending in the axial direction of the tire, and protruding both end portions 11a and 11b outwardly from the base portion 9 so as to connect the both end portions with tire members Ty electrically conducted to a rim J at a state of mounting the tire on the rim; and a cap portion 10 made of electrically non-conductive rubber compounding silica and disposed outside the conducting portion 11 in the radial direction of the tire and forming a major part of a ground contact surface 2a.

14 Claims, 12 Drawing Sheets

(56) References Cited

U.S. PATENT DOCUMENTS

| | | |
|---|---|---|
| 2007/0039672 A1 | 2/2007 | Lo |
| 2008/0283165 A1* | 11/2008 | Mafune et al. ............ 152/152.1 |
| 2009/0050257 A1 | 2/2009 | Frerichs |

FOREIGN PATENT DOCUMENTS

| | | |
|---|---|---|
| JP | 2004-507397 A | 3/2004 |
| JP | 2005-280021 A | 10/2005 |
| JP | 2007-290485 * | 11/2007 |
| JP | 2007-290485 A | 11/2007 |
| JP | 2008-24096 A | 2/2008 |
| JP | 2008-285070 A | 11/2008 |
| JP | 2009-126291 A | 6/2009 |
| WO | WO 2007/112809 A1 | 10/2007 |
| WO | WO 2008/101555 * | 8/2008 |

OTHER PUBLICATIONS

European Search Report dated Jul. 4, 2013 for Application No. 10774776.8.
International Search Report, issued in PCT/JP2010/054517 dated Jun. 3, 2010.

* cited by examiner

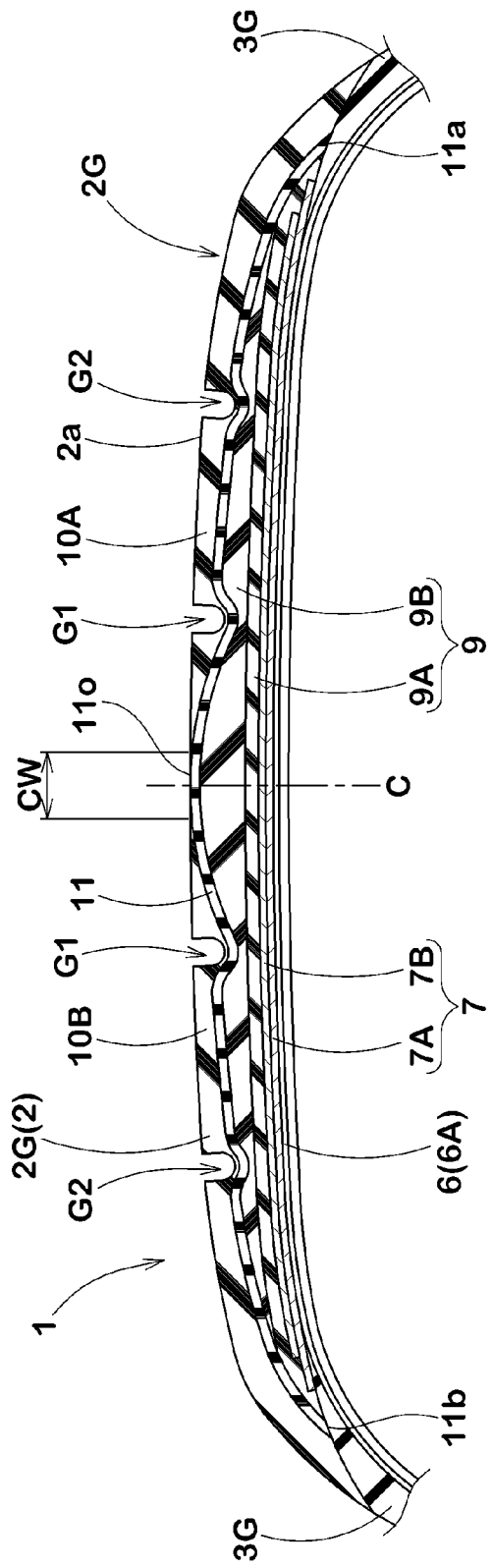

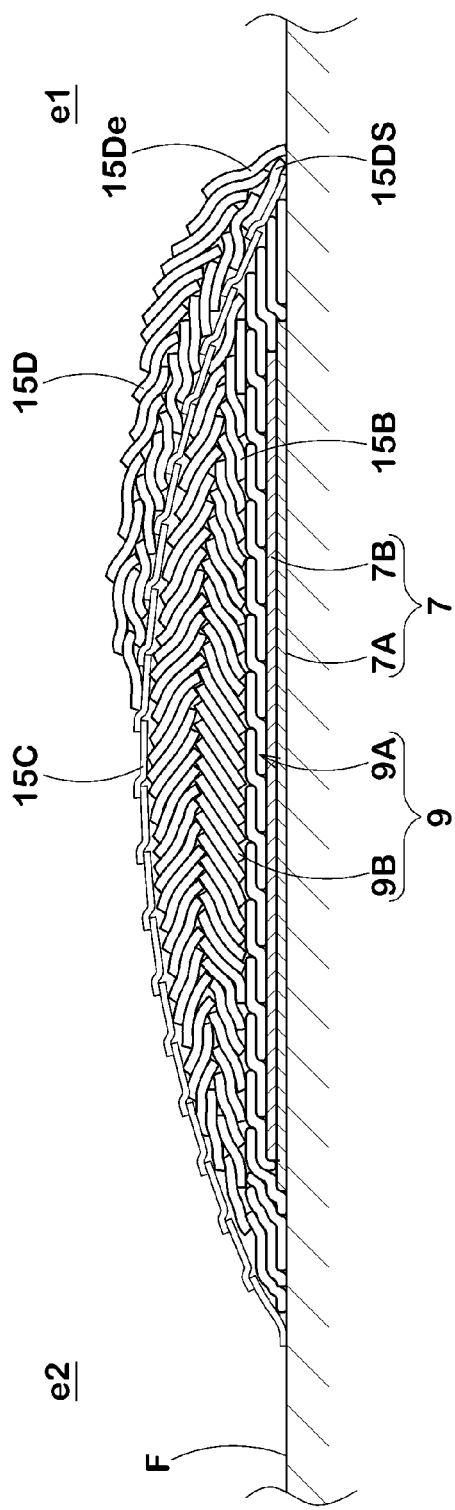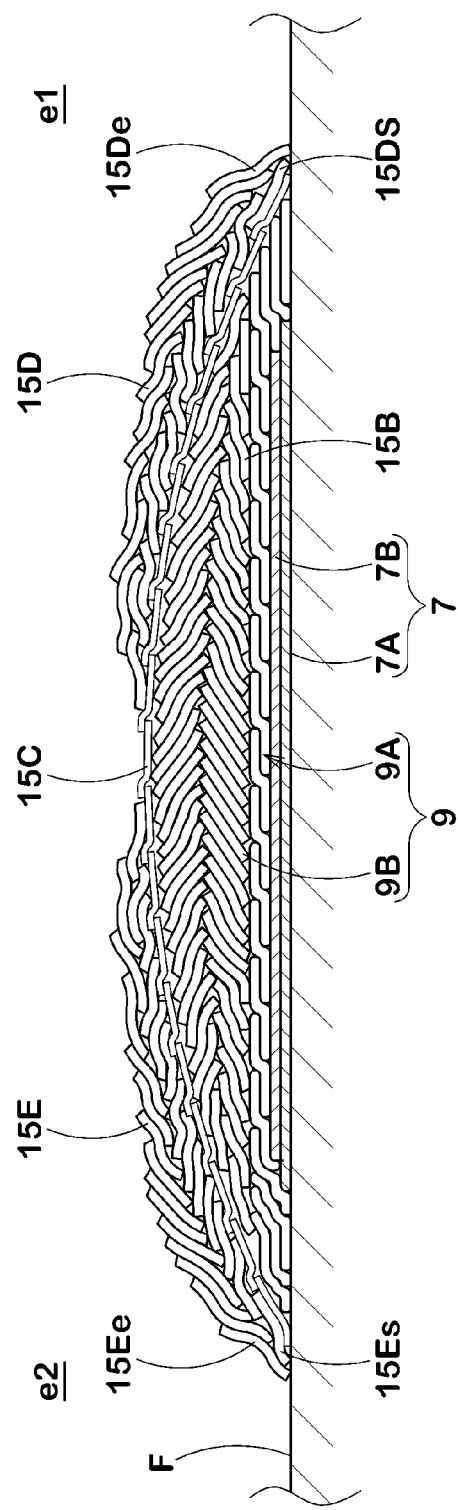

PNEUMATIC TIRE

TECHNICAL FIELD

The present invention relates to a pneumatic tire enabling to discharge static electricity from a vehicle into a road surface.

BACKGROUND OF THE INVENTION

In recent years, a tread rubber of a pneumatic tire contains much silica. The silica brings in advantages of diminishing rolling resistance of the tire and improving wet grip performance. However, the silica is inferior in electrical conductivity, and it increases an electric resistance of tire. A tire having a large electric resistance accumulates the static electricity in the vehicle, and it possibly causes radio disturbance such as radio noise.

In general, to prevent the static electricity from accumulating in the vehicle, a tread rubber (a) shown in FIG. 15 is proposed in the under mentioned Patent document 1, for example. The tread rubber (a) having a double-layered structure comprising a base portion (b) inwardly-located in the radial direction of the tire and a cap portion (c) outwardly-located in the radial direction of the tire. To improve motion performance and the like of the tire, the base portion (b) and the cap portion (c) are made of electrically non-conductive rubber of silica-rich compound. Additionally, each of the base portion (b) and the cap portion (c) is divided into right and left halves. It is provided therebetween with a conducting portion (d) made of electrically conductive rubber of carbon-rich compound, for example, and extending continuously in the tire circumferential direction. The outer surface of the conducting portion (d) forms a part of a ground contact surface (g), and its inner surface is connected to a belt layer (f) and the like which is electrically conducted with a rim.

However, in such a tread rubber (a), there is formed a region without the base portion (b) having a small rolling resistance rubber is formed continuously in the tire circumferential direction. This tread rubber (a) is not sufficiently expected to diminish the rolling resistance efficacy. Additionally, the base portion (b) is completely divided into the right and left helves, and at a time of forming the tread rubber (a), the base portion (b) is liable to move over from an applying position and the like, so that the tire uniformity tends to degrade.

Additionally, in the under mentioned Patent document 2, a tread rubber (a) is proposed as shown in FIG. 16. The tread rubber (a) comprises abase portion (b) continuing in the tread width direction; in the outward thereof, a first cap portion (c1) and a second cap portion (c2) divided into right and left helves; and a conducting portion (d) of which one end (d1) becomes exposed on a ground contact surface (g) between the first cap portion (c1) and the second cap portion (c2), and of which the other end (d2) extends between the first cap portion (c1) and the base portion (b) in the tire axial direction and connected to a sidewall rubber (not shown) and the like electrically conducted with the rim.

In such a tread rubber (a), the base portion continues in the axial direction of the tire, and it can be more expected to improve a lower rolling-resistance property in comparison to the tread rubber shown in FIG. 15.

Patent document 1: Laid-open Patent publication 3P-9-71112
Patent document 2: Patent Application 3P-2007-301992.

DISCLOSURE OF THE INVENTION

Problems to be Solved by the Invention

However, in the tread rubber (a) of the Patent document 2, although the conducting portion (d) extends between the first cap portion (c1) and the base portion (b), there is no conducting portion (d) between the second cap portion (c2) and the base portion (b). Therefore, to produce a symmetric appearance of the profile of the tread rubber (a), in view of a thickness of the conducting portion (d), it is necessary to differ the profile such that the thickness of the first cap portion (c1) is smaller than a thickness of the second cap portion (c2). This complicates a process of manufacture and causes a productivity decline. Additionally, a rigidity of the tread rubber (a) in the side of the first cap portion (c1) provided with the conducting portion (d) differs a rigidity of the tread rubber (a) in the side of the second cap portion (c2) provided with no conducting portion (d), so that an uniformity of the tire easily gets worse; in particular, conicity is liable to increase.

In view of the above-mentioned problems, the present invention is on the basis of that a tread rubber comprises a conducting portion covering an outer surface of the base portion, extending in the axial direction of the tire, and connecting the both end portions with tire members electrically conducted to a rim; and in a meridian section of the tire, the radially outmost surface of this conducting portion is exposed on the ground contact surface. It is therefore a main object of the present invention is to provide a pneumatic tire taking advantage of a low rolling-resistance of silica compounded rubber and having beneficial effects on uniformity and an electrical conductivity.

Means for Solving the Problem

According to the present invention, a pneumatic tire comprises a toroidal carcass extending from a tread portion to a bead core in a bead portion through a sidewall portion, a tread reinforcing-cord layer disposed outside the carcass in the radial direction of the tire and inside the tread portion in the radial direction of the tire, and a tread rubber disposed outside the tread reinforcing-cord layer in the radial direction of the tire. The pneumatic tire is characterized in that the above-mentioned tread rubber comprises a base portion, a conducting portion and a cap portion. The base portion made of electrically non-conductive rubber compounding silica, disposed outside the above-mentioned tread reinforcing-cord layer in the radial direction of the tire, and having a width substantially equal to a width of the tread reinforcing-cord layer. The conducting portion made of electrically conductive rubber, covering a radially outer surface of the above-mentioned base portion and extending in the axial direction of the tire, and protruding both end portions outwardly from the above-mentioned base portion so as to connect the both end portions with tire members electrically conducted to a rim at a state of mounting the tire on the rim. The cap portion made of electrically non-conductive rubber compounding silica and disposed outside the above-mentioned conducting portion in the radial direction of the tire and forming a major part of a ground contact surface. In the meridian section of the tire, the radially outmost surface of the above-mentioned conducting portion is exposed on the above-mentioned ground contact surface. The above-mentioned cap portion comprises a first cap portion disposed on one side and a second cap portion disposed on another side of the outmost surface of the above-mentioned conducting portion in the axial direction of the tire.

According to another aspect of the present invention, the above-mentioned conducting portion is smoothly convex outwardly in the radial direction of the tire and comprises an arc curved part having the outmost portion at the top.

According to another aspect of the present invention, the above-mentioned outmost surface continuously extends on the tire equator in the circumferential direction of the tire.

According to another aspect of the present invention, the above-mentioned first cap portion and the above-mentioned second cap portion are substantially symmetrical with respect to the tire equator.

According to another aspect of the present invention, the above-mentioned base portion comprises an inside layer part disposed inwardly in the radial direction of the tire and having a substantially uniform thickness and an outside layer part disposed outwardly in the radial direction of the tire and having a thickness gradually increasing from the both end portions toward the tire equator.

According to another aspect of the present invention, at least one of the above-mentioned base portion, the above-mentioned conducting portion, and the above-mentioned cap portion is made of a strip lamination formed by spirally winding the ribbon-like rubber strip.

According to another aspect of the present invention, the outside layer part of the above-mentioned base portion is made of a strip lamination formed by spirally winding the rubber strip from the one end toward the other end of the outside layer part in the axial direction of the tire, the winding direction of the rubber strip is changed at the above-mentioned other end, and the winding terminates at the above-mentioned one end.

According to another aspect of the present invention, the above-mentioned first cap portion is made of a strip lamination formed by spirally winding the rubber strip from the outer end toward the inner end of the first cap portion in the axial direction of the tire, the winding direction of the rubber strip is changed at the above-mentioned inner end, and the winding terminates at the above-mentioned outer end.

According to another aspect of the present invention, the above-mentioned second cap portion is made of a strip lamination formed by spirally winding the rubber strip from the outer end toward the inner end of the above-mentioned second cap portion in the tire axial direction, the winding direction of the rubber strip is changed at the above-mentioned inner end, and the winding terminates at the above-mentioned outer end.

According to another aspect of the present invention, the above-mentioned tire member is a sidewall rubber disposed outside the above-mentioned carcass in the tire axial direction or a topping rubber of the above-mentioned carcass.

According to another aspect of the present invention, the above-mentioned conducting portion protrudes at least not less than 2 mm from the above-mentioned base portion.

In the present description, the "electrical conductivity" is a property that a material substantially conducts electricity. More particularly, it is a property of material having a value of volume intrinsic electric resistance of less than $1.0 \times 10^8$ ($\Omega \cdot cm$).

The "electrical non-conductivity" is a property that a material does not substantially conduct electricity. More particularly, it is a property of material having a value of volume intrinsic electric resistance of not less than $1.0 \times 10^8$ ($\Omega \cdot cm$).

Moreover, the "volume intrinsic electric resistance value" of rubber is measured with an apparatus of electric resistance measurement under the following condition:

Rubber sample: 15 centimeters square and 2 millimeters thick
Applied voltage: 500 V
Air temperature: 25 deg. C
Humidity: 50%.

Effect of the Invention

In the pneumatic tire, there is a conducting portion on the inward side of each of a first cap portion and a second cap portion in the radial direction of the tire. Therefore, the tread rubber can be easily formed symmetrically even if the first cap portion and the second cap portion are formed in an identical profile. This helps to prevent a manufacturing process from getting complex and to improve productivity. Especially, when the first cap portion and the second cap portion are formed substantially symmetrically with respect to the tire equator, the productivity improves more.

The conducting portion is arranged in the inside of each of the first cap portion and second cap portion in the radial direction of the tire, and the rigidity of tread rubber in the side of the first cap portion and the rigidity of tread rubber in the side of the second cap portion can be easily equalized. This can prevent a deterioration of uniformity of the tire.

When the conducting portion is smoothly convex outwardly in the radial direction of the tire and comprises an arc curved part having the above-mentioned outmost portion at the top as shown in the invention, even if the tread rubber wears, it can expose a new conducting portion outside both of the outmost portion in the axial direction of the tire. Therefore, a static electricity discharging efficacy can be maintained for long periods of time.

Additionally, winding the rubber strip allows to join a winding beginning and a winding terminate of the rubber strip. Therefore, uneven caused by the edges of the rubber strip can be tempered; eventually, the uniformity can be more improved.

BRIEF EXPLANATION OF THE DRAWING

FIG. 4 A cross-sectional view of a pneumatic tire showing another embodiment of the present invention.

FIGS. 7 (a) and (b): Cross-sectional views to explain a molding process of the tread rubber.

EXPLANATION OF THE REFERENCE

Figure 1:
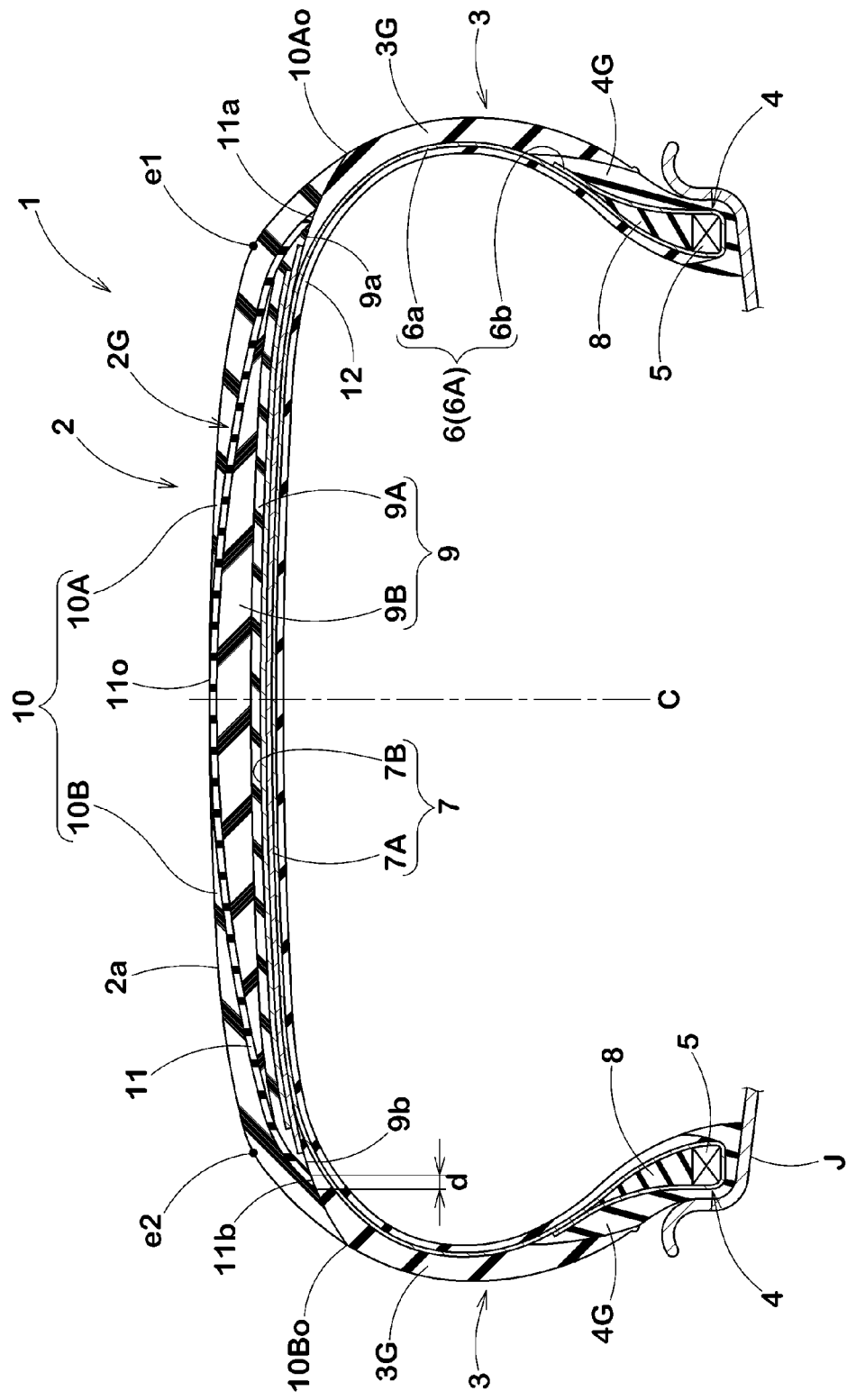
FIG. 1 A cross-sectional view of a pneumatic tire showing an embodiment of the present invention.

1 Pneumatic tire
2 Tread portion
2a Ground contact surface
2G Tread rubber
3 Sidewall portion
3G Sidewall rubber
4 Bead portion
4G Clinch rubber
5 Bead core
6 Carcass
7 Tread reinforcing-cord layer
9 Base portion
10 Cap portion
10A First cap portion
10B Second cap portion
11 Conducting portion
11a, 11b Both end portions of conducting portion
11o Outmost surface of conducting portion
15, 15A, 15B, 15C, 15D, 15E Rubber strips
J Rim

BEST MODE FOR CARRYING OUT THE INVENTION

Hereinafter, embodiment of the present invention will be described with referent to the drawings.

As shown in FIG. 1, a pneumatic tire 1 of the present embodiment comprises a toroidal carcass 6 extending from a tread portion 2 to a bead core 5 of a bead portion 4 through a sidewall portion 3, and a tread reinforcing-cord layer 7 disposed outside the carcass 6 in the radial direction of the tire and inside the tread portion 2.

The above-mentioned carcass 6 is formed of a single carcass ply 6A having a radial structure, for example. The carcass ply 6A comprises, for example, a main portion 6 (a) connecting the bead cores 5 and 5, and a pair of turned up portions 6 (b) continuing into the both ends thereof and turned up around each of the bead cores 5 from the axial inside to the axial outside of the tire. Moreover, between the main portion 6 (a) and the turned up portion 6 (b) of the carcass ply 6A, there is a bead apex rubber 8 extending from the bead core 5 outwardly in the radial direction.

The above-mentioned tread reinforcing-cord layer 7 is formed by layering not less than two belt plies, two belt plies 7A and 7B in the present example, made of metal cords arranged at an angle of 15 to 40 degrees with respect to the tire circumferential direction, for example. The tread reinforcing-cord layer 7 can comprise, in the outermost, a band ply (not shown) made of organic fiber cords directed substantially parallel each other in the tire circumferential direction, if necessarily.

Each of the above-mentioned carcass ply 6A and the belt plies 7A and 7B are formed of plies for tire comprising a cord and topping rubber to cover it. The topping rubber contains lots of carbon black as a filling-up agent. For this reason, a value of the volume intrinsic electric resistance of each of the topping rubbers is less than $1.0 \times 10^8$ ($\Omega \cdot cm$), and the topping rubber has an electrical conductivity.

Additionally, in the sidewall region and on the outside the carcass 6, there is a sidewall rubber 3G forming a tire outer surface. A radially outer end of the sidewall rubber 3G terminates between the above-mentioned carcass 6 and the tread reinforcing-cord layer 7.

Moreover, in the outside of the carcass 6 of the bead region, there is a clinch rubber 4G getting in contact with a rim J. The clinch rubber 4G is connected to the above-mentioned sidewall rubber 3G.

Also, the above-mentioned sidewall rubber 3G and the clinch rubber 4G contain lots of carbon black as a filling-up agent. A value of each of the volume intrinsic electric resistances is less than $1.0 \times 10^8$ ($\Omega \cdot cm$) and has the electrical conductivity. Therefore, when the pneumatic tire 1 is mounted on the rim J, the sidewall rubber 3G forms a tire member electrically conductible to the rim J.

Inside the carcass 6, there is an air-impermeable inner liner rubber 12.

In the radially outside of the above-mentioned tread reinforcing-cord layer 7, there is a tread rubber 2G. The tread rubber 2G of the present embodiment comprises a base portion 9 made of electrically non-conductive rubber and disposed outwardly in the tire radial direction of the above-mentioned tread reinforcing-cord layer 7;

a conducting portion 11 made of electrically conductive rubber and extending in the tire axial direction with covering a radially outer surface of the above-mentioned base portion 9, and of which the radially outmost surface 11o exposes on a ground contact surface 2a; and a cap portion 10 made of electrically non-conductive rubber and forming a main part of the ground contact surface 2a disposed outside the above-mentioned conducting portion 11 in the radial direction of the tire.

The ground contact surface 2a of the tread portion 2 is a surface of the tread portion 2 which contacts a plane surface when a tire under regular state of the tire mounted on a regular rim inflated to a regular pressure and loaded with regular load is contacted with the plane surface at a camber angle of zero degree. Also, the axially outermost ends of this ground contact surface are tread edges e1 and e2.

The "regular rim" is a rim determined for each tire by a standard including one on which the tire is based. For example, it is a standard rim in the case of JATMA, a "Design Rim" in the case of TRA, and a "Measuring Rim" in the case of ETRTO.

The "regular internal pressure" means an air pressure determined for each tire by the standard. For example, it is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO. When the tire is for a passenger vehicle, the regular internal pressure is 180 KPa.

The "regular load" is a load determined for each tire by the standard. For example, it is the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO. When the tire is for a passenger vehicle, the regular load is a load equivalent to 88% of the above-mentioned load.

In the present embodiment, silica-rich compound rubber compounding much silica is used for the above-mentioned base portion 9 and the cap portion 10. Such a silica-rich compound rubber improves a wet grip performance especially in the cap portion 10. And, in the base portion 9, the silica-rich compound rubber can produce an effect of vehicle driving performance such as reduction of heat generation and of a rolling resistance and the like. Meanwhile, owing to compounding silica in plenty, each of the base portion 9 and the cap portion 10 has a electrical non-conductivity as stated above.

The rubber polymer forming the above-mentioned base portion 9 and the cap portion 10 includes, for example, natural rubber (NR), butadiene rubber (BR), styrene butadiene rubber (SBR), polyisoprene rubber (IR), nitrile rubber (NBR), chloroprene rubber (CR) and the like. Single specie or not less than two species of them can be blended.

Additionally, the silica compounded in the base portion 9 and the cap portion 10 is not especially limited, but to improve the reinforce effect for rubber and rubber processability, the silica having a surface area determined from nitrogen adsorption (BET) ranging from 150 to 250 $m^2$/gram and a dibutyl phthalate (DBP) oil absorption of not less than 180 ml/100 gram, and having colloidal characteristic is preferably used. Additionally, as a silane-coupling agent, bis (triethoxysilylpropyl) tetrasulfide and alpha-mercaptpropyltrimethoxysilane are preferably used.

To improve the low rolling-resistance performance and the wet grip performance in higher level, a combination amount of the silica into the base portion 9 and the cap portion 10 is preferably not less than 30 parts by mass, more preferably not less than 40 parts by mass, and preferably not more than 100 parts by mass, more preferably not more than 80 parts by mass, furthermore preferably not more than 60 parts by mass with respect to the rubber polymer 100 parts by mass.

Additionally, in the above-mentioned base portion 9 and the cap portion 10, carbon black may be supplementarily compounded. This is useful in adjusting other rubber property, such as rubber elasticity and rubber hardness, for example. In this case, a combination amount of carbon black is preferably less than the combination amount of silica, particularly not more than 15 parts by mass, more preferably not more than 10 parts by mass with respect to rubber polymer 100 parts by mass. The combination amount of the carbon black of over 15 parts by mass is not preferable because the rolling resistance deteriorates considerably, and the rubber is liable to become excessively hard.

The above-mentioned base portion 9 is deposited upon the tread reinforcing-cord layer 7 and continuously extending from the one tread edge e1 side to the other tread edge e2 side without disruptions. The base portion 9 of the present embodiment has an axial width larger than the tread reinforcing-cord layer 7 to completely cover the tread reinforcing-cord layer 7. Therefore, each of the axially outer ends 9a and 9b of the base portion 9 is positioned axially outer than the end portion of the tread reinforcing-cord layer 7, forms a tapered form, for example, and is connected to the sidewall rubber 3G.

Meanwhile, in the above-mentioned embodiment, the base portion 9 is formed to be larger in width than the tread reinforcing-cord layer 7, but it may also be formed to be smaller than it. However, when the width of the base portion 9 becomes small, the suppressive effect of the heat generation in an inside region of the tread rubber 2G may not be sufficient. From the viewpoint of this, the axial width of the base portion 9 is about from 0.80 to 1.10 times the width (maximum width) of the tread reinforcing-cord layer 7 and is preferably formed by substantially equal to the width of the tread reinforcing-cord layer 7.

The base portion 9 of the present embodiment comprises an inside layer part 9A disposed interiorly in the radial direction of the tire and having a substantially constant thickness; and an outside part 9B disposed outwardly in the radial direction of the tire, having a thickness gradually reducing from the both end portions toward the tire equator C, and being substantially symmetric. A beneficial compound in adhering performance is preferably used because the inside layer part 9A is disposed on a side of the tread reinforcing-cord layer 7 comprising the steel cords. In contrast, the outside part 9B closes in the ground contact surface side and has an opportunity to contact the road surface in wear. Therefore, the composition is determined in view of the wear resistance and the like. Of course, the compositions of these inside part 9A and outside part 9B may be the same, and the base portion 9 may be formed of a single specie rubber.

The above-mentioned conducting portion 11 is formed of electrically conductive rubber. The preferable composition of such rubber is, for example, a rubber composition of carbon-rich compound, but it can also be, for example as substitute for carbon or with carbon, a rubber compounded electrically conductive powder (metal powder, for example) and the like.

The conducting portion 11 covers the radially outer surface of the base portion 9, extends in the axial direction of the tire, and protrudes the both end portions 11a and 11b outwardly from the base portion 9. In the present embodiment, each of the end portions 11a and 11b of the conducting portion 11 is connected with a sidewall rubber 3G as a tire member electrically conducted to a rim J. To keep an enough contact between the conducting portion 11 and the sidewall rubber 3G, each of the end portions 11a and 11b of the conducting portion 11 preferably has a protruding length (d) from the base portion 9 of at least not less than 2 mm. The both end portions 11a and 11b conducting portion 11 may be connected with the topping rubber of the carcass ply 6A as substitute for the sidewall rubber 3G.

Additionally, the conducting portion 11 is, in the tire meridian section, smoothly convex outwardly in the radial direction of the tire, and the outmost surface 11o of the tire radial direction is exposed on the ground contact surface 2. The conducting portion 11 of the present embodiment is formed as an arc-curved part having the above-mentioned outmost portion 11o at the top.

Additionally, the conducting portion 11 of the present embodiment is substantially symmetrical with respect to the tire equator C. Therefore, the outmost portion 11o of the conducting portion 11 exposes the ground contact surface 2a on the tire equator C. Additionally, the outmost portion 11o extends on the tire equator C in the circumferential direction of the tire. With this arrangement, the outmost portion 11o can be certainly contacted with the road surface.

The above-mentioned cap portion 10 is made of a first cap portion 10A disposed in the axially one side and a second cap portion 10B disposed in the axially other side of the outmost surface 11o of the conducting portion 11. In the present embodiment, the first cap portion 10A is disposed on one tread edge e1 side of the tire equator C (right side, in FIG. 1) and the second cap portion 10B is disposed on the other tread edge e2 side (left side, in FIG. 1) of the tire equator C.

The axially outer ends 10Ao and 10Bo of the cap portions 10A and 10B are provided outside the tread edges e1 and e2, in particular, provided outside the axially outer ends 9a and 9b of the base portion 9, respectively. In other words, except the conducting portion 11, the ground contact surface 2a is formed of the radially outer surfaces of the first cap portion 10A and the second cap portion 10B. Additionally, as shown in FIG. 2 in close-up, each of the cap portions 10A and 10B decrease gradually in thickness to the axially inner end 10Ai or 10Bi.

Furthermore, the first cap portion 10A and the second cap portion 10B of the present embodiment are substantially symmetrical with respect to the tire equator C. The tread rubber 2G including the base portion 9, the conducting portion 11 and the cap portion 10 is formed substantially in a symmetrical shape with respect to the tire equator C.

The pneumatic tire 1 of the present embodiment formed as mentioned above, static electricity accumulated in the vehicle is discharged from the outmost portion 11o through the rim J, the clinch rubber 4G, the sidewall rubber 3G and the conducting portion 11 toward the road surface. This makes an improvement of troubles such as radio noise.

Figure 2:
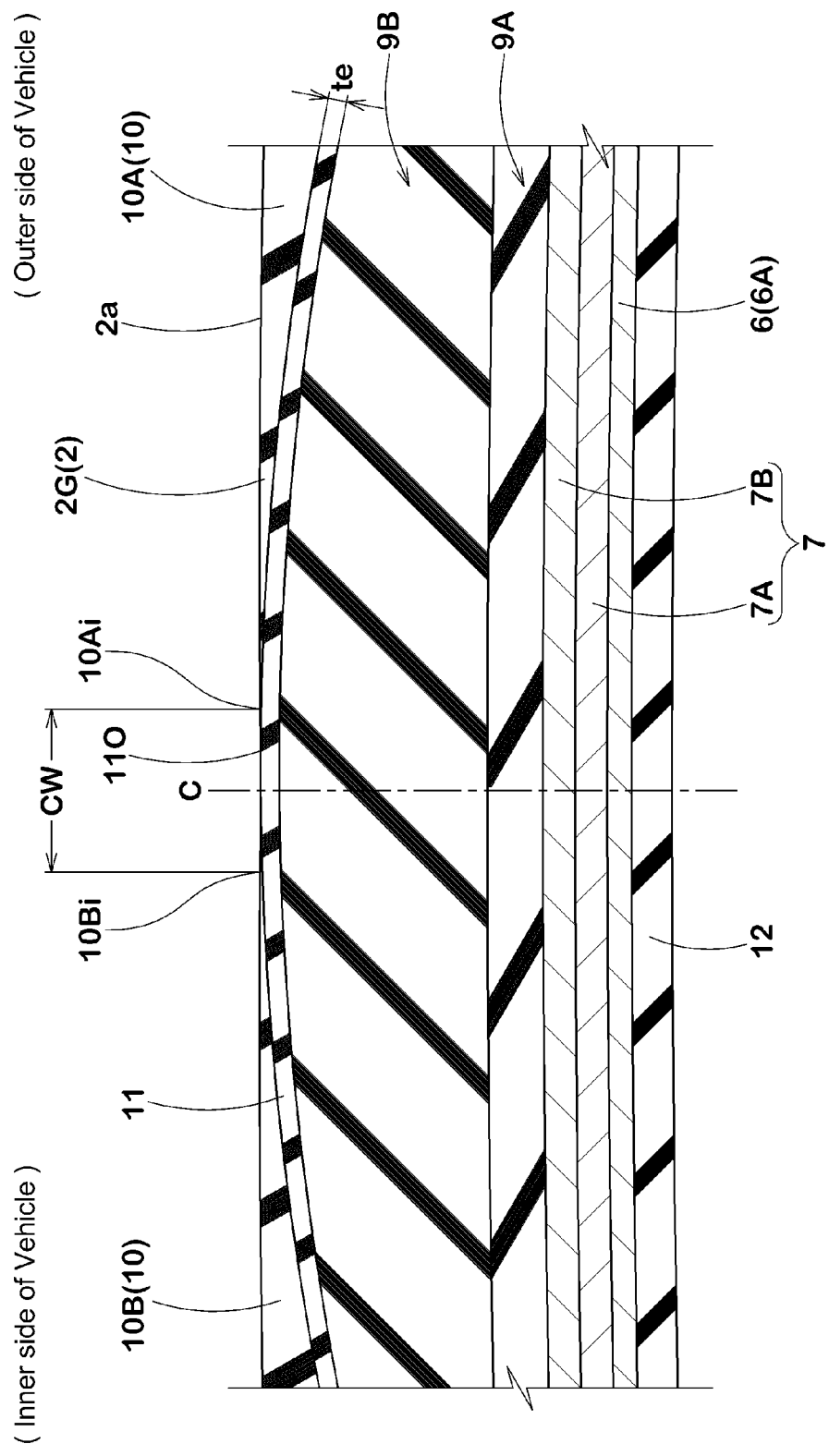
FIG. 2 A partially enlarged view of a tread portion thereof.
Figure 3A:
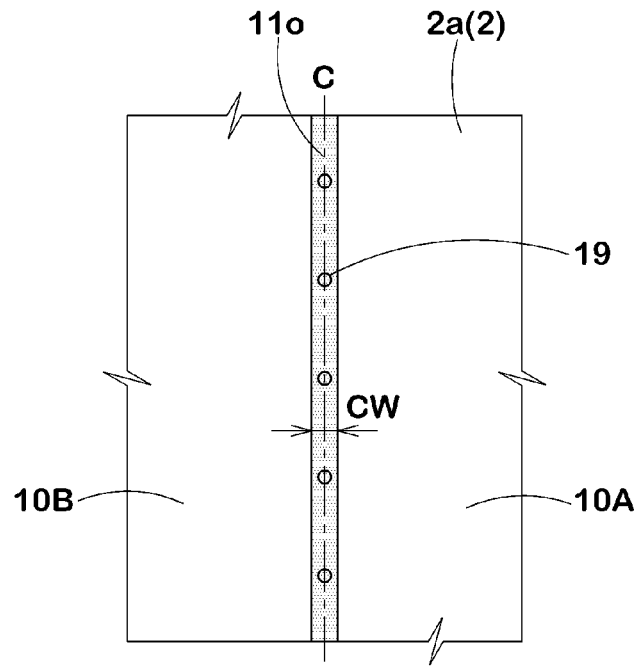
FIG. 3 (a): A partial top view of the tread portion; and (b): showing a wear status.
Figure 3B:
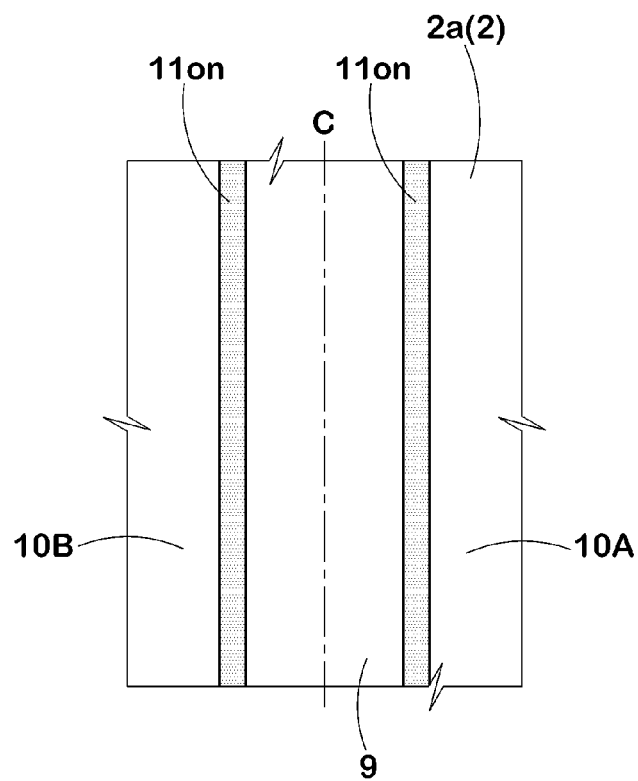

To achieve sufficiently an effect of such a conducting efficacy, as shown in FIG. 2 and FIG. 3 (a), an axial width Cw of the outmost portion 11o of the conducting portion 11 is preferably not less than 0.5 mm, more preferably not less than 1.0 mm, furthermore preferably not less than 1.5 mm. When the width Cw of the outmost portion 11o becomes large, the actual vehicle properties of the tread rubber 2G such as wet performance and low-rolling resistance may deteriorate. From the viewpoint of this, the above-mentioned width Cw is preferably not more than 20 mm, more preferably not more than 10 mm, furthermore preferably not more than 5 mm. Also, to get a better ground contacting performance of the outmost portion 11o, the outmost portion 11o can be provided with an elevated portion such as spew taken up into a vent hole of a mold and the like at the time of vulcanization molding.

In the same sense, a thickness (te) (shown in FIG. 2) of the conducting portion 11 is preferably not less than 0.3 mm, more preferably not less than 0.5 mm; preferably not more than 5 mm, more preferably not more than 3 mm.

Additionally, the base portion 9 of the tread rubber 2G continuously extends without disruptions, so that it does not impair the low rolling-resistance property. Moreover, a forming accuracy of the tread rubber 2G improves, and the uniformity of the tire improves substantially. In particular, because the tread rubber 2G is substantially symmetrical with respect to the tire equator C, the rigidity of the tread rubber 2G can be substantially equivalent in both sides of the tire equator C. Therefore, conicity can be substantially reduced.

Additionally, FIG. 3 (b) shows a wear state of the tread rubber 2G. Owing to the wear of the tread rubber 2G, the conducting portion 11 of the present embodiment disappears from the tire equator C, and the base portion 9 becomes exposed. Additionally, on both outsides of the base portion 9, a single (two, in sum total) new outmost portion 1ion of the conducting portion 11 can be exposed, respectively. Thus, the other end of those outmost portions 1ion is connected with the sidewall rubber 3G so that the above-mentioned conducting efficacy can be enhanced and be kept for a long time.

FIG. 4 shows another embodiment of the present invention.

In this embodiment, the tread rubber 2G is provided with plural main grooves extending in the tire circumferential direction: for example, a pair of inner main groove G1 disposed on both sides of the tire equator C and outer main grooves G2 disposed in the outside thereof. Each of the main grooves G1 and G2 is formed by a protrusion for tread groove forming of the vulcanization mold (not shown).

At the time of tire vulcanization, in groove sole parts of the main grooves G1 and G2, the conducting portion 11 is also pressed in the radial direction of the tire under pressure from the above-mentioned protrusion. However, between the inner main grooves G1 and G1, the conducting portion 11 becomes smoothly convex outwardly in the radial direction of the tire and formed as an arc curved part having the above-mentioned outmost portion 11o at the top. Therefore, also in this embodiment, the above-mentioned conducting efficacy can be obtained.

Figure 5:
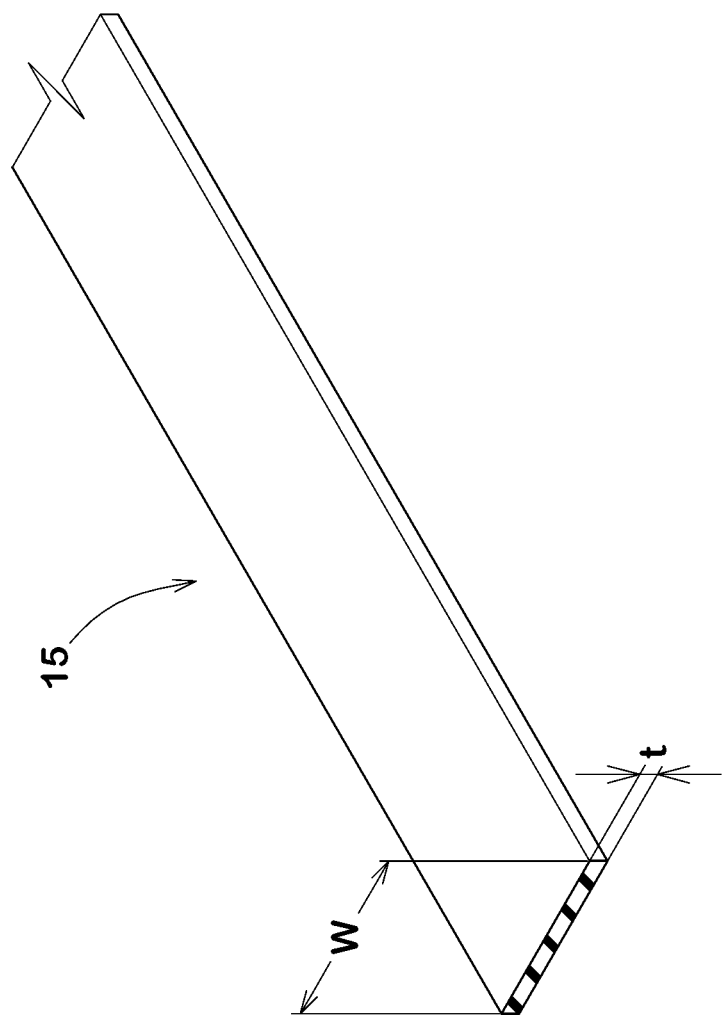
FIG. 5 A diagrammatic perspective view of a rubber strip showing an example.

In one of embodiments of these pneumatic tires 1, all of the members forming the tread rubber 2G, that is to say, the base portion 9, the cap portion 10 and the conducting portion 11, are formed by strip lamination formed by winding the ribbon-like rubber strip 15 unvulcanized and small in width as shown in FIG. 5. Meanwhile, the above-mentioned "unvulcanized" is a rubber state where vulcanization has not completely finished. Therefore, the unvulcanised rubber includes the rubber that is not much more than preliminarily vulcanized rubber.

The above-mentioned rubber strip 15 is a ribbon-like rectangle in cross-section having a width w larger than a thickness (t). The width w and the thickness (t) of the rubber strip are not particularly limited, but the width w is preferably in a range of 5 to 50 mm and the thickness (t) is preferably in a range of about 0.5 to 3 mm. When the width of the rubber strip is less than 5 mm, or when the thickness (t) is less than 0.5 mm, the rubber strip becomes easy to fracture at the time of spirally winding, and the production efficiency may deteriorate because of increase of the number of winding. When the width W of the rubber strip is over 50 mm, or when the thickness (t) is over 3 mm, it is liable to be difficult to form the precise cross sectional shape by spirally winding.

Figure 6A:
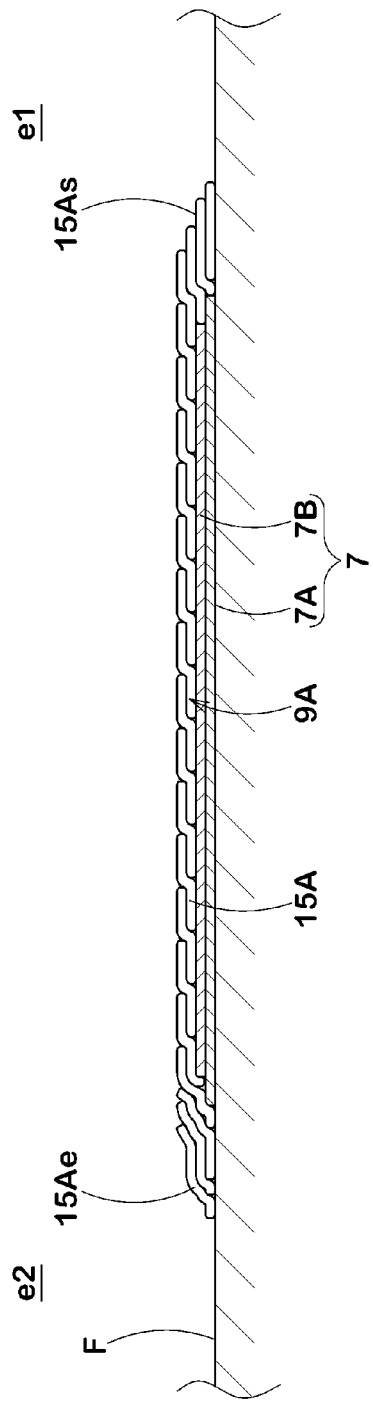
FIGS. 6 (a) and (b): Cross-sectional views to explain a molding process of the tread rubber.
Figure 6B:
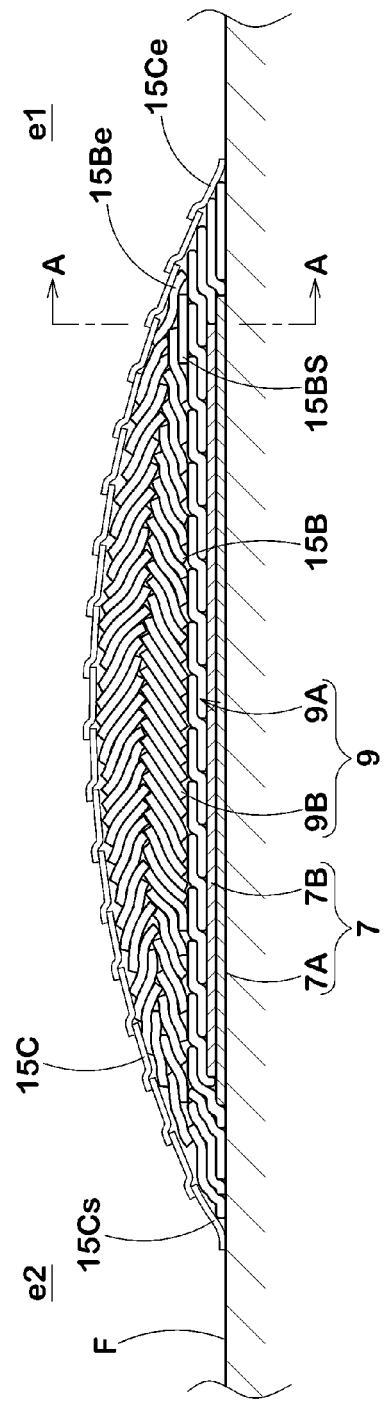

FIG. 6 and FIG. 7 show forming processes of the tread rubber made of such a rubber strip 15 in chronological order.

In the tread rubber forming process, as shown in FIG. 6 (a), outside a cylindrical shaping former F where the tread reinforcing-cord layer 7 is wound preliminarily, the rubber strip 15A having the electrical non-conductivity owing to the silica-rich compound is spirally wound. This conducts a forming step of forming the inside layer part 9A of the base portion 9.

More particularly, on the one tread edge e1 side, the beginning of winding 15As of the rubber strip 15A is fixed on the shaping former F axially outer than the tread reinforcing-cord layer 7. After that, the shaping former F is rotated, and the rubber strip 15A is moved to the other tread edge e2 side at a predetermined speed. In this arrangement, the rubber strip 15A is spirally wound on the shaping former. At this time, the side edges of the rubber strip 15A are preferably overlapped each other. Additionally, the winding terminate 15Ae of the rubber strip 15A is fixed on the shaping former F at a position over the tread reinforcing-cord layer 7 in the axial direction of the tire. This forms the inside layer part 9A as completely covering the tread reinforcing-cord layer 7.

As shown in FIG. 6 (b), the outside layer part 9B of the base portion 9 is formed on the outside of the inside layer part 9A in the radial direction of the tire. In this step, the winding beginning 15Bs of the rubber strip 15B having the electrical non-conductivity property of the silica-rich compound is fixed to the outside of the inside layer part 9A in the radial direction of the tire and to the one tread edge e1 side. Thus, the rubber strip 15B is spirally wound over the tire equator C and toward the other tread edge e2 side, the winding direction of the rubber strip is changed at the end of the other tread edge e2, and the winding terminates at the above-mentioned winding beginning 15Bs. In other words, the winding terminate 15Be of the rubber strip 15B terminates and is attached on the winding beginning 15Bs. During that time, the rubber strip 15B is continuously wound. Also, by adjusting a winding pitch of the rubber strip 15, a thickness of the central region of the outside layer part 9B is set to large.

In the outside layer part 9B, the winding beginning 15Bs and the winding terminate 15Be of the rubber strip 15B are respectively arranged expecting in the crown portion Co subjected to a high ground pressure and are overlapped one another; therefore, a radial-run-out (hereinafter called, "RRO") becomes small, and the uniformity is improved in particular a radial force variation at a high speed running (hereinafter called, "RFV"). Incidentally, it comes near to stating the obvious the winding aspect of the rubber strip 15B is not limited to such an aspect, that various changes may be made.

As shown in FIG. 6 (b), by spirally winding the rubber strip 15C made of the electrically conductive rubber outside the base portion 9, the forming step of the conducting portion 11 is conducted. In this step, for example, on the other tread edge e2 side, the winding beginning 15Cs of the rubber strip 15C is fixed to a position outward over the base portion 9, and the spirally winding direction is toward the one tread edge e1 side, and the winding terminate 15Ce is fixed to a position outward over the base portion 9. And, the rubber strip 15C in the present embodiment is preferably wound without gap to the side edges of the rubber strip 15C overlapping one another.

As shown in FIG. 7 (a), conducted is a step of forming the above-mentioned first cap portion 10A. In this step, the electrically non-conductive rubber strip 15D owing to the silica-rich compound is wound outside the conducting portion 11 in the radial direction of the tire and on the one tread edge e1 side so as to form the first cap portion 10A. In the present embodiment, the winding beginning 15Ds of the rubber strip 15D is fixed to a position outward over the outer end on the one tread edge e1 side of the conducting portion 11. The rubber strip 15D is spirally wound on the inside in the axial direction of the tire, the winding direction of the rubber strip is changed before the tire equator C, and then the rubber strip 15D is wound on the outside in the axial direction of the tire. The winding terminates at the above-mentioned winding beginning 15Ds. In other words, the winding beginning 15Ds and the winding terminate 15De of the rubber strip 15D are overlapped. During that time, the rubber strip 15D continues.

And after that, as shown in FIG. 7 (b), conducted is a step of forming the above-mentioned second cap portion 10B. In this step, the electrically non-conductive rubber strip 15E (It comes near to stating the obvious that compositions of this rubber strip 15E and the rubber strip 15D of the first cap portion 10A may be the same.) owing to the silica-rich compound is wound outside the conducting portion 11 in the radial direction of the tire and on the other tread edge e2 side so as to form the second cap portion 10B. In the present embodiment, the winding beginning 15Es of the rubber strip 15E is fixed to a position outward over the outer end 10 on the other tread edge e2 side of the conducting portion 11. Thus, the rubber strip 15E is spirally wound on the inside in the axial direction of the tire, the winding direction of the rubber strip is changed before the tire equator C, and then the rubber strip 15E is wound on the outside in the tire axial direction. The winding is terminated at the above-mentioned winding beginning 15Ds. In other words, the winding terminate 15Ee and the winding terminate 15Es of the rubber strip 15E are overlapped.

The first cap portion 10A and the second cap portion 10B are formed with separating from one another and with exposing the conducting portion 11. Additionally, in the present embodiment, the first cap portion 10A and the second cap portion 10B substantially symmetric with respect to the tire equator C. For this reason, the first cap portion 10A and the second cap portion 10B have the same in winding number of the rubber strip and in profile and the like. Therefore, the production efficiency of the above-mentioned cap portions 10A and 10B improves.

In these cap portions 10A and 10B, as the same way to the outside part 9B of the base portion 9, the winding beginning 15Ds, winding beginning 15Es, winding terminate 15De and winding terminate 15Ee of the rubber strip 15 are arranged respectively expecting in the crown portion Co subjected to the high ground pressure and overlapped one another; therefore, the uniformity improves.

By the forming process of the tread rubber as stated above, made is the tread rubber 2G integrally with the tread reinforcing-cord layer 7. Thus, in accordance with customary practice, a green tire is molded by outserting the tread rubber 2G into the tread region of the toroidally shaped carcass 6; and by vulcanizing it, the pneumatic tire is manufactured.

Figure 8:
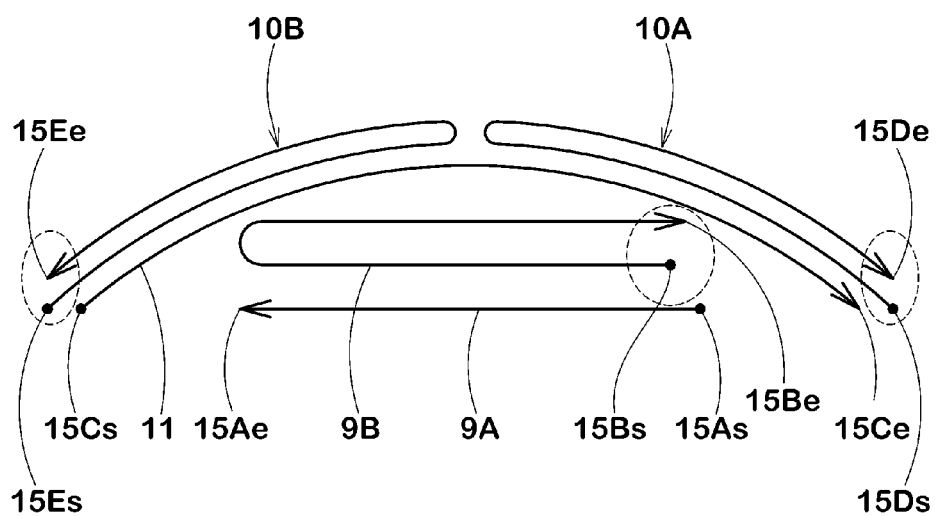
FIG. 8 A pattern diagram explaining a winding direction of the rubber strip.
Figure 9:
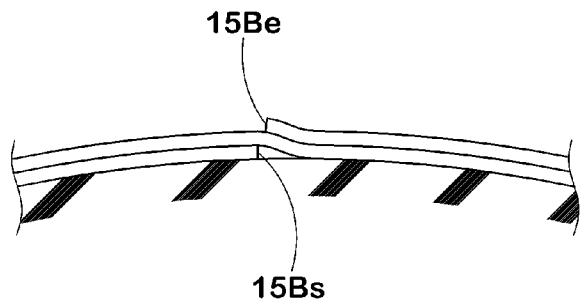
FIG. 9 A cross-sectional view taken on line A-A of FIG. 6 (b).

FIG. 8 shows a pattern diagram explaining the winding direction of the rubber strip 15 in each portion with respect to the tread rubber 2G of the above-mentioned embodiment; and FIG. 9 shows a cross-sectional view taken on line A-A of FIG. 6 (b), as an example. Consequently, the circumferential end portions of the winding beginning 15Bs and the winding terminate 15Be of the rubber strip are trim. This helps to improve the uniform weight balance in the tire circumferential direction in the each rubber portion; and the uniformity improves.

Figure 10:
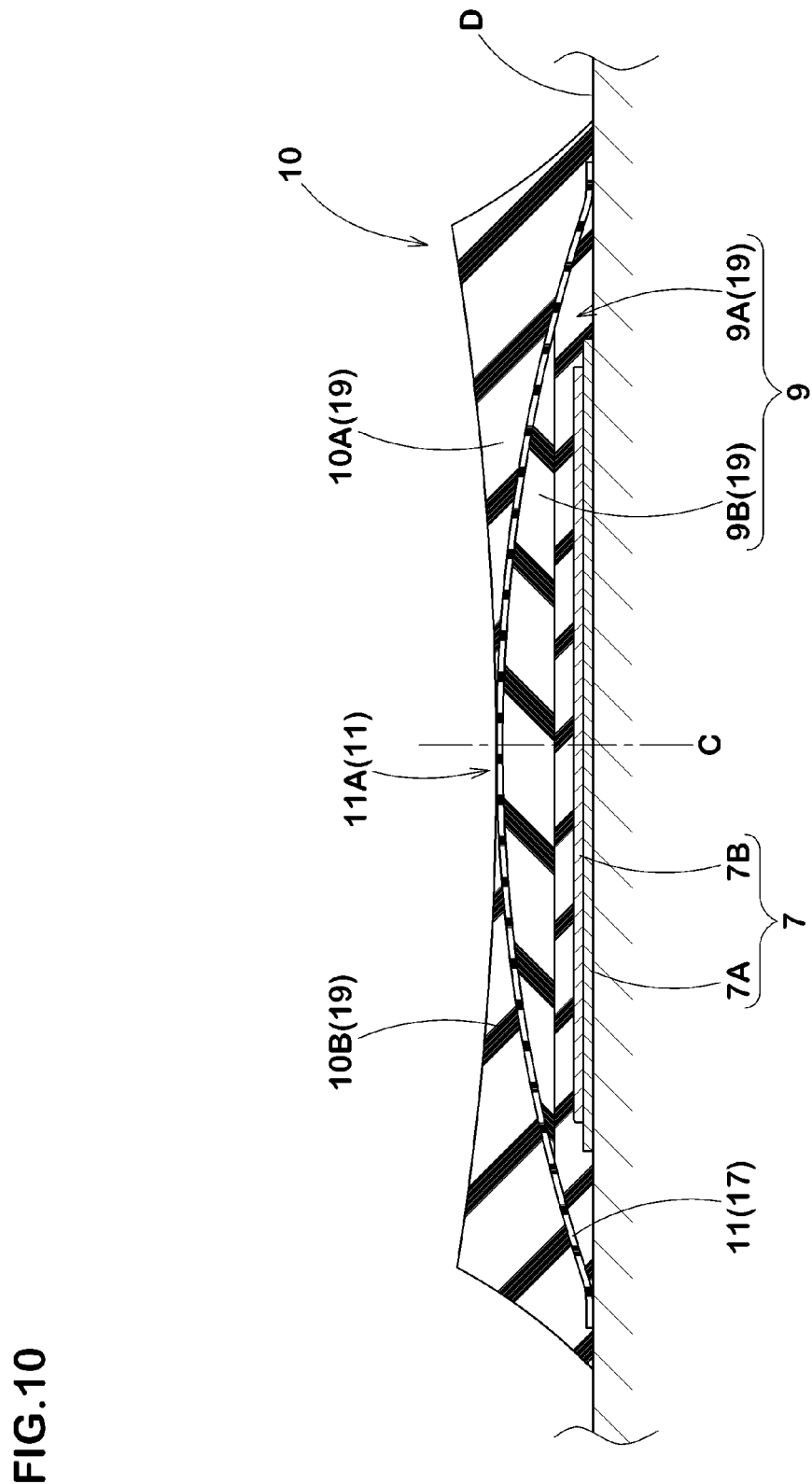
FIG. 10 A cross-sectional view of the tread rubber showing another embodiment of the present invention.
Figure 11:
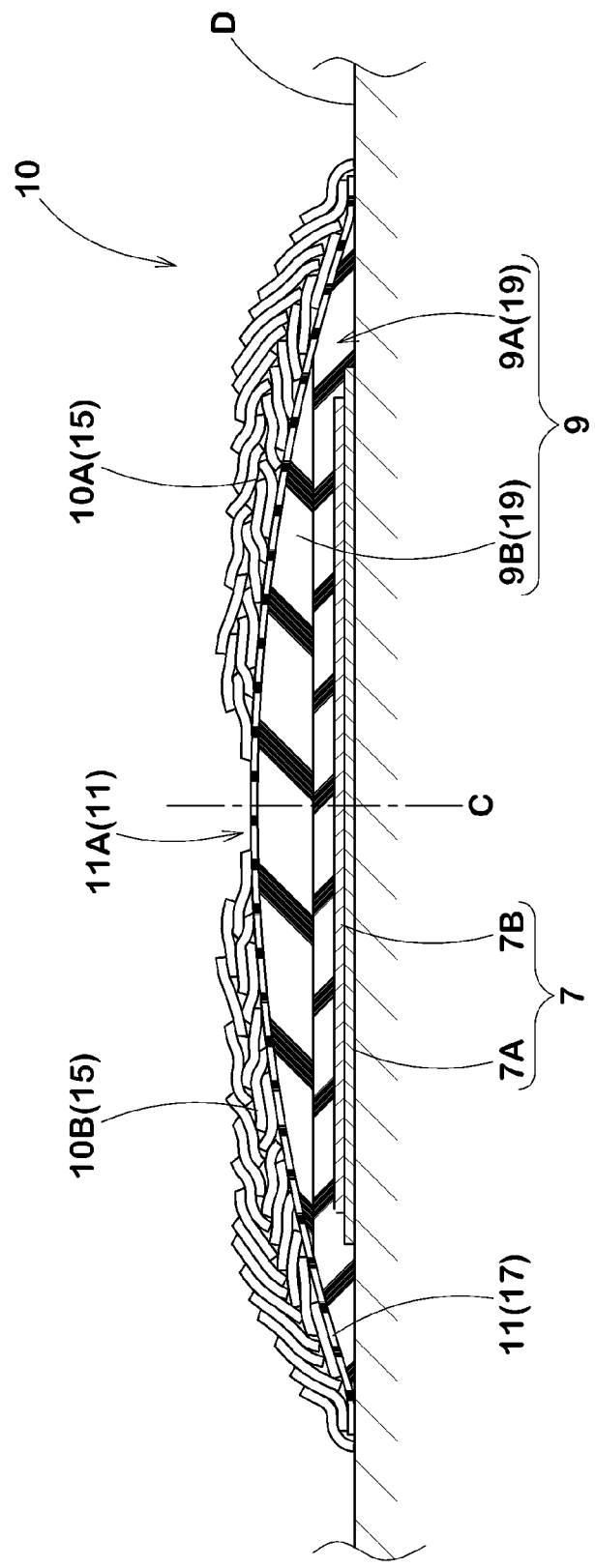
FIG. 11 A cross-sectional view of the tread rubber showing another embodiment of the present invention.

FIG. 10 shows another embodiment of the present invention. In this embodiment, the base portion 9 and the cap portion 10 are formed by splicing an extruded rubber 19 extruded by a rubber extruder. In this embodiment, the extruded rubber 19 of the inside layer part 9A is wound on the outside of the tread reinforcing-cord layer 7, and the extruded rubber 19 of the outside layer part 9B is wound on the outside of the inside layer part 9A, respectively. After this, on the outside of them, the conducting portion 11 is formed by winding at least one layer of a rubber seat 17 continuing in the width direction from the above-mentioned one end to the other end and by splicing the both axially outer edges. After that, on the outside of the conducting portion 11, the cap portions 10A and 10B are disposed. Also, FIG. 11 shows a yet another embodiment of the present invention. In this embodiment, adapted are a process of manufacture by an extrudate for the conducting portion and the base portion and a process of manufacture by spiral winding for the cap portion.

Although the especially preferred embodiments of the pneumatic tire and the method for manufacturing it in the present invention have been described in detail, needless to say, the invention is not limited to the above-mentioned concrete embodiments, and various modifications can be made.

EXAMPLE

Test pneumatic tires (Size: 215/45R17) having a basic structure shown in Table 1 were made, and electric resistance and uniformity of each of the tires were measured. In each example, electrically non-conductive rubber was used for a cap portion and a base portion, and electrically conductive rubber was used for a conducting portion, respectively. They were the same in composition in each example. Moreover, the tires were identical, except parameters shown in Table 1. Test method was as follows.

<Electric Resistance of Tire>

Figure 15:
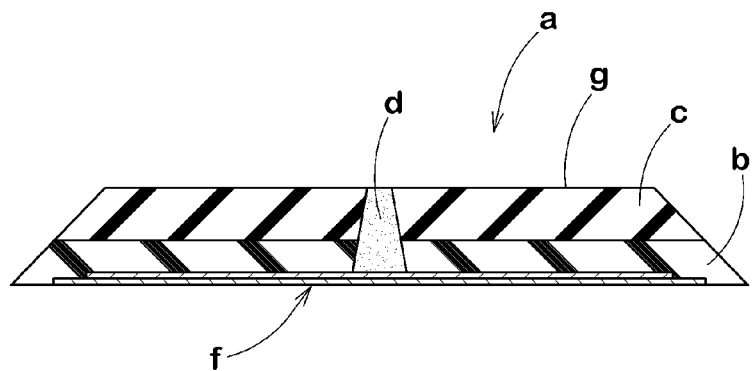
FIG. 15 A cross-sectional view of the tread portion explaining conventional art.

As shown in FIG. 15, an electric resistance value of an assembly of the test tire and a rim J was measured according to the procedure specified by the Japan Automobile Tire Manufacturers Association (JATMA) by the use of a measuring apparatus. The measuring apparatus comprises a metal plate 21 (Electric resistance value: not more than 10Ω) of which surface was polished and which was placed on an insulation plate 20 (Electric resistance value: not less than $10^{12}\Omega$), a electrically conductive tire-mounting shaft 22 to keep the tire/rim assembly, and an electric resistance measuring instrument 23. As to the each of the test tires 1, releasing agent and dirty were amply removed from its surface in advance, and the tire was amply dry. Moreover, other conditions were as follows:

Rim material: Aluminum alloy product
Rim size: 17×7 J
Internal pressure: 200 kPa
Load: 5.3 kN
Rim: 17×7 J
Internal pressure: 200 kPa
Load: 4.7 kN
Velocity: 80 km/h.

<Uniformity of Tire>

In accordance with a uniformity test condition of JASO C607:2000, RFV was measured under the following condition in each of the test tires. Evaluation was defined as the reciprocal of each RFV and displayed using indices with Comparative Example 1 being 100. The larger the numeric value was, the more favorable it was.

Rim: 17×7 J
Internal pressure: 200 kPa
Load: 4.08 kN
Velocity: 10 km/h
The test results and the like are shown in Table 1.

TABLE 1

Figure 12:
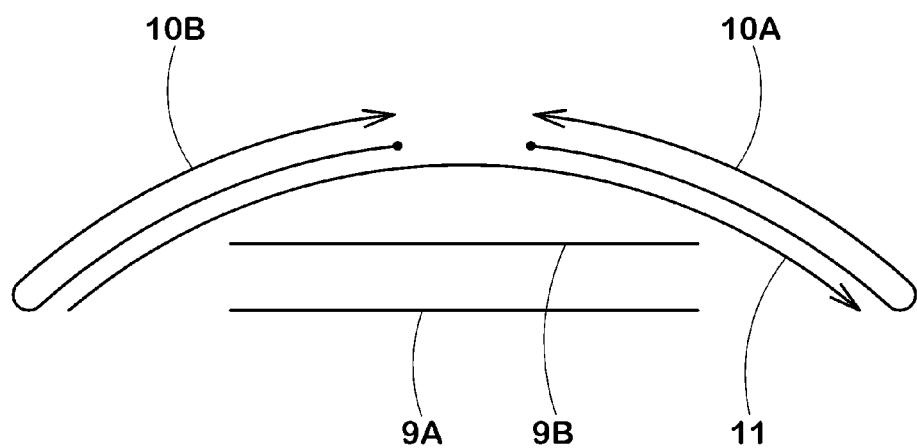
FIG. 12 A view showing a frame format of another method of winding the rubber strip.
Figure 13:
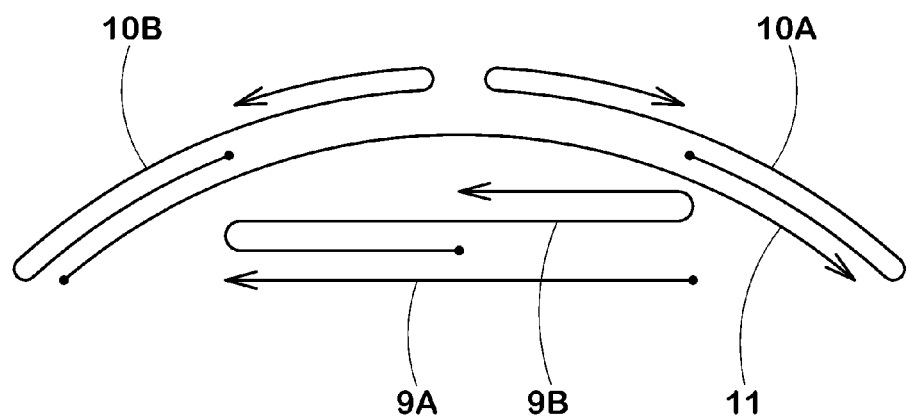
FIG. 13 A view showing a frame format of another method of winding the rubber strip.
Figure 14:
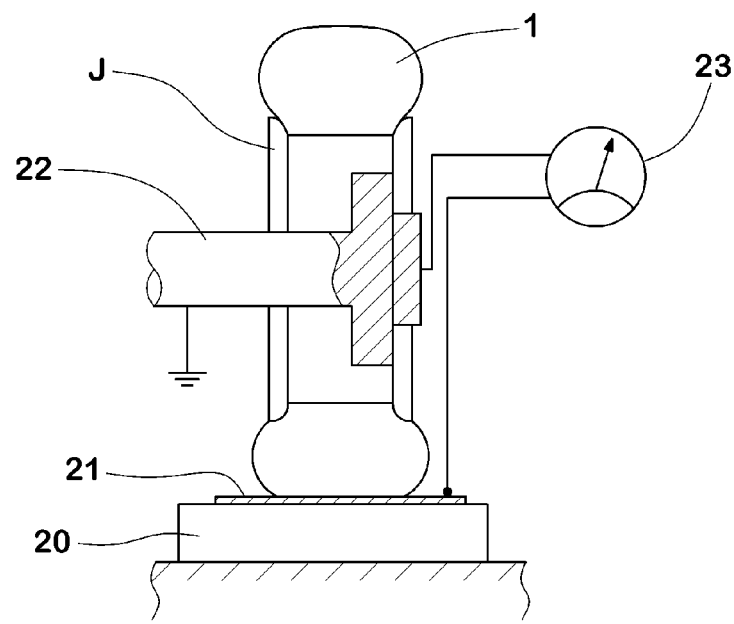
FIG. 14 A schematic cross-sectional view conceptually showing an apparatus of electric resistance measurement for tire.
Figure 16:
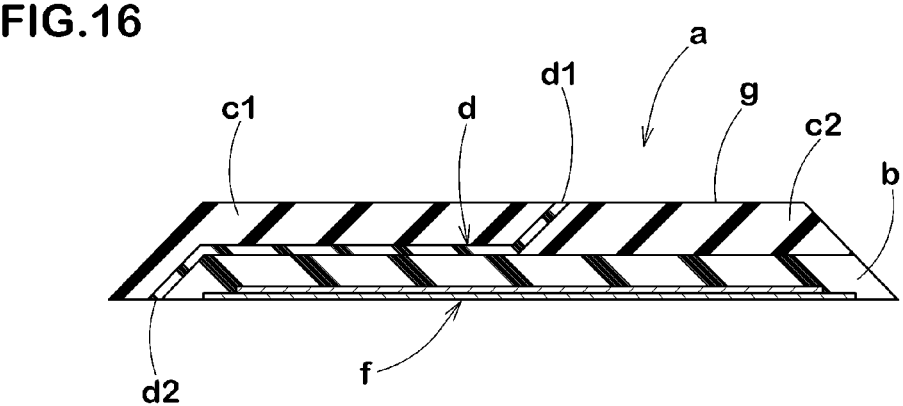
FIG. 16 A cross-sectional view of the tread portion explaining conventional art.

|  | Comparative Example 1 | Comparative Example 2 | Example 1 | Example 2 | Example 3 | Example 4 | Example 5 | Example 6 |
|---|---|---|---|---|---|---|---|---|
| Drawing showing Structure of Tread rubber | FIG. 15 | FIG. 16 | FIG. 10 | FIG. 11 | FIG. 7 | FIG. 7 | FIG. 7 | FIG. 7 |
| Drawing showing Winding of Rubber strip | — | — | — | FIG. 12 | FIG. 13 | FIG. 8 | FIG. 8 | FIG. 8 |
| Manufacturing method of Cap portion | Extrudate | Spiral winding of Rubber strip | Extrudate | Spiral winding of Rubber strip | Spiral winding of Rubber strip | Spiral winding of Rubber strip | Spiral winding of Rubber strip | Spiral winding of Rubber strip |
| Manufacturing method of Conducting portion | Extrudate | Spiral winding of Rubber strip | Extrudate | Extrudate | Spiral winding of Rubber strip | Spiral winding of Rubber strip | Spiral winding of Rubber strip | Spiral winding of Rubber strip |
| Manufacturing method of Base portion | Extrudate | Spiral winding of Rubber strip | Extrudate | Extrudate | Spiral winding of Rubber strip | Spiral winding of Rubber strip | Spiral winding of Rubber strip | Spiral winding of Rubber strip |
| Protruding length (d) of Conducting portion [mm] | — | — | 1 | 1 | 1 | 1 | 2 | 3 |
| Electric resistance of Tire (×$10^7$ Ω) | 1.2 | 0.5 | 0.4 | 0.4 | 0.4 | 0.4 | 0.2 | 0.1 |
| Rolling resistance (Index) | 100 | 103 | 102 | 105 | 105 | 106 | 106 | 106 |
| Uniformity of Tire (Index) | 100 | 110 | 113 | 115 | 118 | 120 | 121 | 121 |

Test environment temperature (Testing laboratory temperature): 25 deg. C
Humidity: 50%
Measurement range of apparatus of electric resistance measurement: from $1.0 \times 10^3$ to $1.6 \times 10^{16} \Omega$
Test voltage (Applied voltage): 1000 v.
The procedures of the test were as follows:
(1) To mount the test tire 1 on the rim for preparation of the tire/rim assembly. At this time, on the contact region between them, soapy water was used as a lubricant agent.
(2) To leave the tire/rim assembly in a testing laboratory for two hours, and to fix it up on the tire-mounting shaft 22.
(3) To apply the above-mentioned load into the tire/rim assembly for 0.5 minutes. After unloading moreover, to apply the load for 0.5 minutes; and after unloading, to apply the load 2 minutes.
(4) After a lapse of 5 minutes in applying the test voltage to the tire, to measure values of electric resistance between the tire-mounting shaft 22 and the metal plate 21 by the use of the apparatus of electric resistance measurement 23. The above-mentioned measurement was conducted at 4 points at 90 degrees intervals in the circumferential direction of the tire. The maximal value among them was defined as an electric resistance value (a measured value) of the tire T.

<Rolling Resistance>

A rolling resistance was measured by the use of a rolling resistance testing apparatus under the following condition. Evaluation was displayed using indices with Comparative Example 1 being 100. The larger the numeric value was, the smaller the rolling resistance was; and the more favorable it was.

For the test results, it was confirmed that the tire according to Examples could be hold down the electric resistance without causing deterioration of the tire uniformity.

The invention claimed is:
1. A pneumatic tire comprising
a toroidal carcass extending from a tread portion to a bead core in a bead portion through a sidewall portion,
a tread reinforcing-cord layer disposed outside the carcass in the radial direction of the tire and inside the tread portion, and
a tread rubber disposed outside the tread reinforcing-cord layer in the radial direction of the tire, characterized in that
said tread rubber comprises
a base portion made of electrically non-conductive rubber compounding silica, disposed outside said tread reinforcing-cord layer in the radial direction of the tire, and having a width substantially equal to a width of the tread reinforcing-cord layer;
a conducting portion made of electrically conductive rubber, covering a radially outer surface of said base portion and extending from an axially one end portion to the other end portion so as to form a continuous smooth arc-curve in the axial direction of the tire, and protruding the both end portions axially outwardly from said base portion so as to connect the both end portions with tire members electrically conducted to a rim at a state of mounting the tire on the rim, wherein a radially outmost portion of said conducting portion in a meridian section of the tire is exposed at a ground contact surface; and a cap portion made of electrically non-conductive rubber compounding silica and disposed outside said conducting portion in the radial direction of the tire and forming a major part of said ground contact surface, wherein said cap portion comprises a first cap portion disposed on one side and a second cap portion disposed on another side of the outmost portion of said conducting portion in the axial direction of the tire, wherein an axial width of the outmost portion of the conducting portion is in a range of from 0.5 to 20 mm.

2. The pneumatic tire as set forth in claim 1, wherein said conducting portion is smoothly convex outwardly in the radial direction of the tire.

3. The pneumatic tire as set forth in claim 1 or 2, wherein said outmost portion continuously extends on the tire equator in the circumferential direction of the tire.

4. The pneumatic tire as set forth in claim 3, wherein said first cap portion and said second cap portion are substantially symmetrical with respect to the tire equator.

5. The pneumatic tire as set forth in claim 1, wherein said base portion comprises an inside layer part disposed inwardly in the radial direction of the tire and having a substantially uniform thickness and an outside layer part disposed outwardly in the radial direction of the tire and having a thickness gradually increasing from the both end portions toward the tire equator.

6. The pneumatic tire as set forth in claim 1, wherein at least one of said base portion, said conducting portion, and said cap portion is made of a strip lamination formed by spirally winding the ribbon-like rubber strip.

7. The pneumatic tire as set forth in claim 5, wherein the outside layer part of said base portion is made of a strip lamination formed by spirally winding the rubber strip from the one end toward the other end of the outside layer part in the axial direction of the tire, the winding direction of the rubber strip is changed at said other end, and the winding terminates at said one end.

8. The pneumatic tire as set forth in claim 1, wherein said first cap portion is made of a strip lamination formed by spirally winding the rubber strip from the outer end toward the inner end of the first cap portion in the axial direction of the tire, the winding direction of the rubber strip is changed at said inner end, and the winding terminates at said outer end.

9. The pneumatic tire as set forth in claim 1, wherein said second cap portion is made of a strip lamination formed by spirally winding the rubber strip from the outer end toward the inner end of said second cap portion in the tire axial direction, the winding direction of the rubber strip is changed at said inner end, and the winding terminates at said outer end.

10. The pneumatic tire as set forth in claim 1, wherein said tire member is a sidewall rubber disposed outside said carcass in the tire axial direction or a topping rubber of said carcass.

11. The pneumatic tire as set forth in claim 1, wherein said conducting portion protrudes at least not less than 2 mm from said base portion in the axial direction of the tire.

12. The pneumatic tire as set forth in claim 1, wherein an axial width of the outmost portion of the conducting portion is in a range of from 0.5 to 10 mm.

13. The pneumatic tire as set forth in claim 1, wherein an axial width of the outmost portion of the conducting portion is in a range of from 0.5 to 5 mm.

14. A pneumatic tire comprising a toroidal carcass extending from a tread portion to a bead core in a bead portion through a sidewall portion, a tread reinforcing-cord layer disposed outside the carcass in the radial direction of the tire and inside the tread portion, and a tread rubber disposed outside the tread reinforcing-cord layer in the radial direction of the tire, characterized in that said tread rubber comprises a base portion made of electrically non-conductive rubber compounding silica, disposed outside said tread reinforcing-cord layer in the radial direction of the tire, and having a width substantially equal to a width of the tread reinforcing-cord layer;

a conducting portion made of electrically conductive rubber, covering a radially outer surface of said base portion and extending from an axially one end portion to the other end portion so as to form a continuous smooth arc-curve in the axial direction of the tire, and protruding the both end portions axially outwardly from said base portion so as to connect the both end portions with tire members electrically conducted to a rim at a state of mounting the tire on the rim, wherein a radially outmost portion of said conducting portion in a meridian section of the tire is exposed at a ground contact surface; and a cap portion made of electrically non-conductive rubber compounding silica and disposed outside said conducting portion in the radial direction of the tire and forming a major part of said ground contact surface, wherein said cap portion comprises a first cap portion disposed on one side and a second cap portion disposed on another side of the outmost portion of said conducting portion in the axial direction of the tire, wherein said conducting portion protrudes at least not less than 2 mm from said base portion in the axial direction of the tire.

* * * * *